United States Patent
Chang et al.

(10) Patent No.: US 6,207,779 B1
(45) Date of Patent: Mar. 27, 2001

(54) RING-OPENED POLYMER

(75) Inventors: Sheng-Yueh Chang, Taipei; Bang-Chein Ho, Hsinchu; Jian-Hong Chen, Hsinchu; Tai-Sheng Yeh, Hsinchu; Jui-Fa Chang, Hsinchu, all of (TW)

(73) Assignees: Industrial Technology Research Institute, Hsinchu; Everlight Chemical Industrial Corporation, Taipei, both of (TW)

( * ) Notice: Subject to any disclaimer, the term of this patent is extended or adjusted under 35 U.S.C. 154(b) by 0 days.

(21) Appl. No.: 09/213,938

(22) Filed: Dec. 17, 1998

(30) Foreign Application Priority Data

Jun. 30, 1998 (TW) .................................................. 87110550

(51) Int. Cl.[7] .................................................. C08F 232/08

(52) U.S. Cl. .................... 526/280; 526/259; 526/270; 526/281; 526/916; 525/256; 525/267; 525/289; 525/283; 430/270.1

(58) Field of Search ........................ 430/270.1; 525/256, 525/262, 289, 283; 526/280, 281, 916, 270

(56) References Cited

U.S. PATENT DOCUMENTS

| | | | |
|---|---|---|---|
| 3,928,497 | 12/1975 | Ohmori et al. | 260/878 |
| 4,491,628 | 1/1985 | Ito et al. | 430/176 |
| 5,278,305 | 1/1994 | Kelsey | 526/135 |
| 6,045,967 | * 4/2000 | Jung et al. | 430/270.1 |
| 6,063,542 | * 5/2000 | Hyeon et al. | 430/270.1 |

* cited by examiner

Primary Examiner—David W. Wu
Assistant Examiner—R. Harlan
(74) Attorney, Agent, or Firm—Darby & Darby

(57) ABSTRACT

The present invention provides a ring-opened polymer, which is prepared by reacting at least one pericyclic olefin elected from those represented by formulae (I) and (II) through ring-opening metathesis polymerization

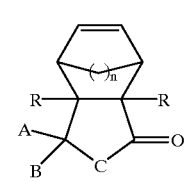

(I)

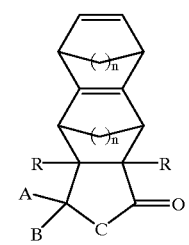

(II)

wherein

A and B may be the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

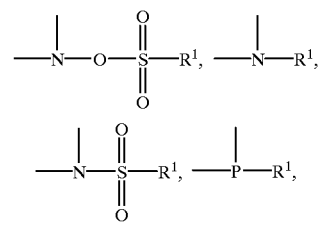

—$CH_2$—, and —$SiH_2$—, wherein each $R^1$ is independently selected from $C_{1-20}$ alkyl and phenyl;

each R is independently selected from hydrogen, halogen, and $C_{1-20}$ alkyl; and each n is an integer from 1 to 6.

44 Claims, No Drawings

RING-OPENED POLYMER

BACKGROUND OF THE INVENTION

1. Field of the Invention

The present invention relates to a novel ring-opened polymer, and more particularly relates to a novel ring-opened polymer that is prepared by reacting at least one specific pericyclic olefin through ring-opening metathesis polymerization.

2. Description of the Prior Art

Nowadays, thin film coating and photosensitive techniques both play very important roles in chemical engineering technology. A resin suitable for thin film coating should meet the requirements of having good film properties and good adherence to substrates. Therefore, the glass transition temperature of such resin should not be too high. To be considered for application to IC photoresists, a suitable resin should further have other properties such as high etch and heat resistance, properties which are frequently achieved by molecular design.

To date, resins frequently used for thin film coating can be classified into two types. One is an acrylic resin that is synthesized by free radical polymerization, which is disclosed in U.S. Pat. No. 4,491,628. The other type is a pericyclic resin that is synthesized by free radical polymerization, which is disclosed in U.S. Pat. No. 3,928,497. However, acrylic resins have inferior etch resistance, and can not be developed by commercial developer, such as 2.38% TMAH (tetramethylammonium hydroxide). Free radical polymerized pericyclic resins have too crowded a structure, thus resulting in a low freedom and too high a glass transition temperature. Therefore, such a pericyclic resin has inferior film properties and crack will occur when it is coated on substrates.

SUMMARY OF THE INVENTION

Therefore, an object of the present invention is to solve the above-mentioned problems and to provide a novel resin, which has good etch resistance, suitable glass transition temperature, good mechanical properties, good film properties, and can be developed by commercial developers.

To achieve the above object, the present invention provides a novel resin, which is an unsaturated ring-opened polymer and is prepared by reacting at least one pericyclic olefin selected from those represented by formulae (I) and (II) through ring-opening metathesis polymerization (ROMP)

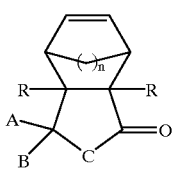

(I)

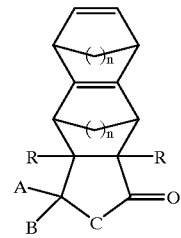

(II)

wherein

A and B may be the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

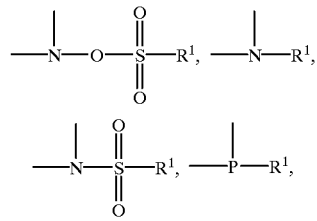

$—CH_2—$, and $—SiH_2—$, wherein each $R^1$ is independently selected from $C_{1-20}$ alkyl and phenyl;

each R is independently selected from hydrogen, halogen, and $C_{1-20}$ alkyl; and each n is an integer from 1 to 6.

Such an unsaturated ring-opened polymer has vinylene groups on its main chain.

The present invention further provides another ring-opened polymer, which is obtained from subjecting the above unsaturated ring-opened polymer to hydrogenation. Such a hydrogenated ring-opened polymer has ethylene groups on its main chain.

DETAILED DESCRIPTION OF THE INVENTION

According to the present invention, formula (I) or (II) is preferably a norbornene derivative, that is, formula (I) or (II) has n equal to 1 and C equal to O (oxygen). That is to say, the ring-opened polymer is prepared by reacting at least one norbornene derivative selected from those represented by formulae (I) and (II) (n=1, C=O) through ring-opening metathesis polymerization.

When formula (I) is a norbornene derivative, representative examples of formula (I) include

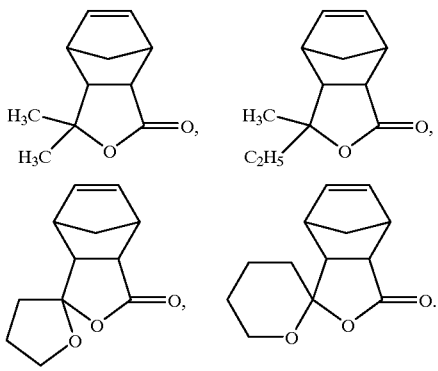

Formula (I) can also be a tricyclic lactone represented by the following formula

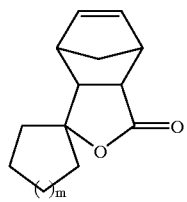

wherein m is an integer from 1 to 3, or

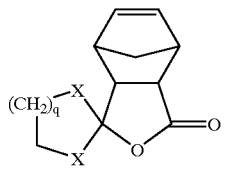

wherein q is an integer from 1 to 3, and X is selected from O, N, or S.

According to the above descriptions, the ring-opened polymer of the present invention is prepared by reacting at least one pericyclic olefin selected from those represented by formulae (I) and (II) through ring-opening metathesis polymerization. For example, at least one pericyclic olefin of formula (I) or (II) can be reacted with at least one other cyclic olefin through ring-opening metathesis copolymerization to obtain the ring-opened polymer of the present invention.

Another example is that at least one pericyclic olefin of formula (I) or (II) is reacted with at least one other cyclic olefin and at least one monomer other than cyclic olefins through ring-opening metathesis copolymerization to obtain the ring-opened polymer of the present invention.

A "chemically amplified resist" is a kind of photoresist in which the rate of dissolution in a developer can be changed by an acid produced by photoirradiation. Such a photoresist solution includes a protected resin, a photoacid generator, and a solvent. The so-called protected resin is a resin that is protected by an acid-labile protective group. The resin will be converted into alkali-soluble when the acid-labile protective group is decomposed. When the chemically amplified resist applied on a substrate is exposed to photo, the photoacid generator will generate acid, and the acid will decompose the acid-labile protective group in the resin, thus making the resin soluble in an alkali developer.

Therefore, if the ring-opened polymer of the present invention is used for a chemically amplified resist, such a ring-opened polymer preferably has an acid-labile protective group, which will be decomposed in the presence of an acid so that the ring-opened polymer will be converted into an alkali-soluble polymer.

Such an acid-labile protective group may be present in formula (I), formula (II), the cyclic olefin that can be copolymerized with formula (I) or (II), or present in any monomer that can be copolymerized with formula (I) or (II).

For example, the cyclic olefin that can be copolymerized with formula (I) or (II) can be norbornene or a norbornene derivative. Such a norbornene derivative can have an acid-labile protective group D. Thus, when the ring-opened polymer of the present invention is in the presence of an acid, the protective group D will be hydrolyzed, such that the ring-opened polymer will be converted to an alkali soluble polymer. Such norbornene derivatives include:

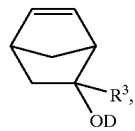 (V)

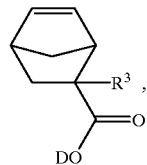 (VI)

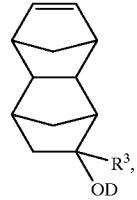 (VII)

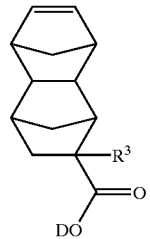 (VIII)

wherein

D is an acid-labile protective group, which is decomposed in the presence of an acid, so as to make the ring-opened polymer alkali-soluble, and each $R^3$ is independently selected from the group consisting of hydrogen, $C_{1-20}$ linear and branched alkyl, $C_{3-20}$ cyclic and pericyclic alkyl.

Representative examples of D include:

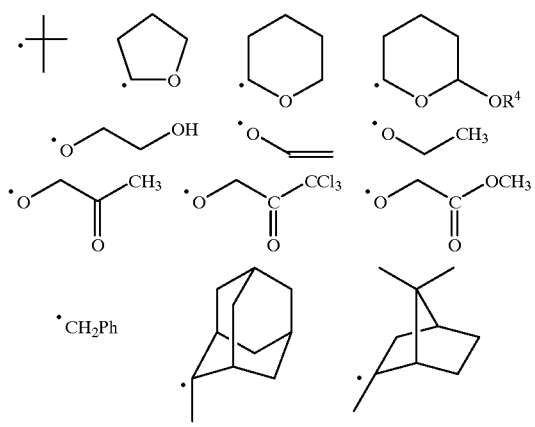

wherein R⁴ is selected from the group consisting of hydrogen, $C_{1-20}$ linear and branched alkyl, $C_{3-20}$ cyclic and pericyclic alkyl.

A compound of formula (I) can be reacted with a norbornene derivative containing acid-labile protective groups through ROMP to obtain a ring-opened polymer. For example, a compound of formula (I) (when n=1) can be reacted with a compound of formulae (VI) and (VIII) to obtain a ring-opened polymer represented by formula (III), which has vinylene groups on its main chain,

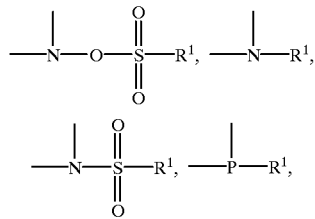

wherein
A and B may be the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

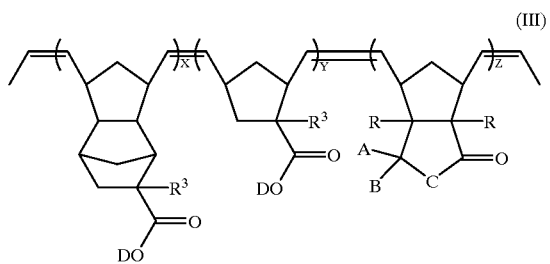

—$CH_2$—, and —$SiH_2$—, wherein each $R^1$ is independently selected from $C_{1-20}$ alkyl and phenyl;

each R is independently selected from hydrogen, halogen, and $C_{1-20}$ alkyl;

D is an acid-labile protective group, which is decomposed in the presence of an acid, so as to make the ring-opened polymer alkali-soluble;

each $R^3$ is independently selected from the group consisting of hydrogen, $C_{1-20}$ linear and branched alkyl, $C_{3-20}$ cyclic and pericyclic alkyl;

X, Y, and Z are the molar ratios of the corresponding monomers;

X+Y+Z=1; and each of X, Y, and Z is in the range of 0.1 to 0.8.

The present invention provides another kind of a ring-opened polymer, which is prepared by reacting at least one pericyclic olefin selected from those represented by formulae (I) and (II) through ring-opening metathesis polymerization to form an unsaturated polymer; and then subjecting the unsaturated polymer to hydrogenation. Therefore, the obtained ring-opened polymer has ethylene groups on its main chain.

For example, a compound of formula (III) can be subjected to hydrogenation to obtain a ring-opened polymer having ethylene groups. The compound of formula (III) may be partially hydrogenated or may be completely hydrogenated. If the compound of formula (III) is completely hydrogenated, a ring-opened polymer represented by formula (IV) can be obtained:

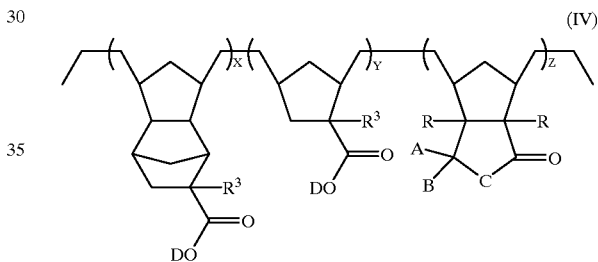

wherein
A, B, C, R, $R^3$, and D are defined as above;
X, Y, and Z are the molar ratios of the corresponding monomers;
X+Y+Z=1; and
each of X, Y, and Z is in the range of 0.1 to 0.8.

Generally speaking, the ring-opening metathesis polymerization of cyclic olefins can be carried out in the presence of an organometallic compound or a mixture thereof as a catalyst. Preferred examples of such organometallic compounds are those containing W, Ir, Ta, or Th.

To make the ring-opened polymer of the present invention suitable for thin film coating, the obtained ring-opened polymer is preferably soluble in an organic solvent. A preferable ring-opened polymer of the present invention has a glass transition temperature of 70° C. to 150° C., a weight average molecular weight of 1000 to 100000, and a decomposition temperature ($T_d$) higher than 80° C. Such ring-opened polymers that meet these requirements are very suitable for use as the resin for thin film coating. Thin film coating can be applied to the coating of photosensitive inks, printing inks, photoresists, and surface coating materials.

When the ring-opened polymer of the present invention is applied to a photoresist (photosensitive composition), a preferred wavelength range is from 150 nm to 600 nm, most preferably at a wavelength of 193 nm or 248 nm. When the ring-opened polymer of the present invention includes an acid-labile protective group, it is most suitable for use in chemically amplified photoresists.

The ring-opened polymer of the present invention can be blended with any other polymer to form a polymer blend. Thereby, the polymer blend can impart properties that the original ring-opened polymer does not have, thus meeting various needs.

The advantages of the present invention can be summarized as follows:

1. The ring-opened polymer (resin) of the present invention has vinylene and/or ethylene groups on its main chain, thus increasing the freedom of the resin, and lowering the glass transition temperature (Tg) thereupon. Therefore, cracking occurring in a free radical-polymerized resin due to high Tg will not occur in the ring-opened polymer of the present invention, thus improving the film properties. In addition, since the Tg is suitable, the post exposure baking temperature for the ring-opened polymer can be in the range of 70° C.–130° C., thus resulting in a broader processing window. When applying the ring-opened polymer of the present invention to IC photoresist, a superior linear relationship will be achieved.

2. Functional groups such as ester, anhydride, ketone, and carbon rings can be introduced into the ring-opened polymer of the present invention by molecular design. The ring-opened polymer can thus have good adherence and etch resistance, which is suitable for application in thin film coating and photosensitive technology.

The following examples are intended to illustrate the process and the advantages of the present invention more fully without limiting its scope, since numerous modifications and variations will be apparent to those skilled in the art.

EXAMPLE 1

Synthesis of the Ring-opened Polymer

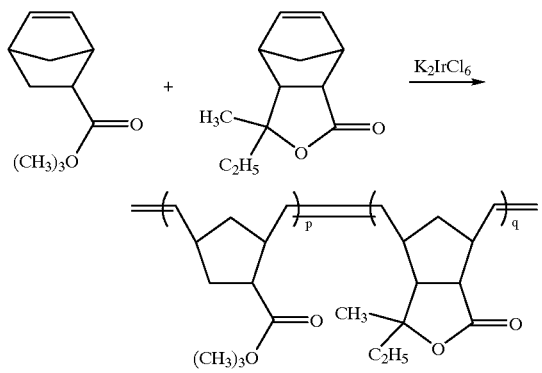

4.85 g of t-butyl norbornene-2-carboxylate, 4.45 g of tricyclo-8-methyl-8-ethyl[$3^{2.7}$, $2^{3.6}$, 1, 2] lactone, 15 g of acetic acid, 5 g of water, 15 g of ethanol, and 15 g of 1,4-dioxane were placed in a reaction vessel. After stirring, 0.72 g of potassium hexachloroiridate(IV) and 0.98 g of zinc were added, and gently heated to 60° C. After 10 minutes, 0.21 g of 1-decene was added and stirred for 24 hours. The reaction solution was poured into a mixture of 100 ml of methanol and 100 ml of n-hexane. The mixture was precipitated, filtered, and dried, and 7.22 g of the resin as a white solid was obtained. The resin has a Tg of 87° C. (analyzed by DSC), a weight average molecular weight of 11200 (analyzed by GPC), and a resin synthesis conversion ratio of 77%.

EXAMPLE 2

Hydrogenation Reaction

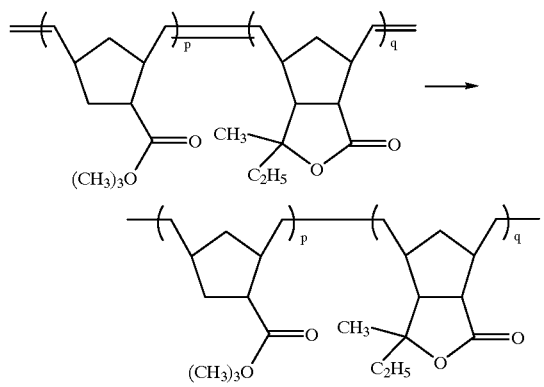

5 g of the ring-opened polymer obtained from Example 1 and 25 g of p-toluene sulfonyl hydrazide were dissolved in 230 g of toluene, and heated under nitrogen to 110° C. After refluxing for 1 hour, the mixture was cooled to room temperature, filtered, and concentrated under reduced pressure. The obtained gel was washed with methanol to afford 1.48 g of the resin as a pale yellow solid. The resin has a Tg of 78° C. (analyzed by DSC), a weight average molecular weight of 13200 (analyzed by GPC), and a resin synthesis conversion ratio of 29.6%.

EXAMPLE 3

Test of Film Properties of the Resin 2.25 g of the resin obtained from Example 1, 0.0675 g of triphenylsulfonium trifluorosulfate and 0.1125 g of 4-butyl cholate were dissolved in 12.75 g of PGMEA (propylene glycol monomethyl ether acetate) and stirred for 12 hours. The mixture was filtered through a 0.2 μm filter. 2 ml of the filtrate was applied to a 4 inch wafer by spin coating at 3000 rpm and soft baked at 130° C. The film thickness was measured by Nanospec to as 7040±27 Å, indicating that the film properties are good.

EXAMPLE 4

Test of Photosensitivity of the Resin

The coated wafer of Example 3 was irradiated through a mask using a 193 nm excimer laser, and the exposure dose of irradiation is 0, 2, 4, 6, 8, 10, 12, 14, 16, 18, 20, 24, 28, 32, 42, 52, 74, and 124 mJ/cm$^2$. After baking for 1 minute at 130° C., the resist coating was developed for 1 minute with an aqueous solution of 2.38% tetramethylammonium hydroxide, and rinsed with distilled water for 15 seconds, then dried to form resist patterns. By measuring the film thickness, it was found that when the exposure dose of irradiation was 28 mJ/cm$^2$, the resin was completely photosensitive and was dissolved in the developer.

What is claimed is:

1. A ring-opened polymer prepared by reacting at least one pericyclic olefin selected from the group consisting of formulae (I) and (II) through ring-opening metathesis polymerization

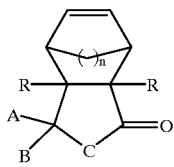
(I)

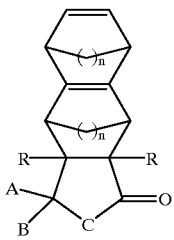
(II)

wherein

A and B are the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

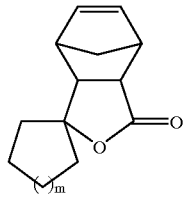

—CH$_2$—, and —SiH$_2$—, wherein each $R^1$ is independently selected from $C_{1-20}$ alkyl and phenyl;

each R is independently selected from hydrogen, halogen, and $C_{1-20}$ alkyl; and each n is an integer from 1 to 6.

2. The ring-opened polymer as claimed in claim 1, wherein n is 1 and C is oxygen.

3. The ring-opened polymer as claimed in claim 1, wherein the formula (I) is selected from the group consisting of

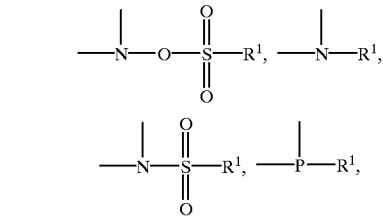

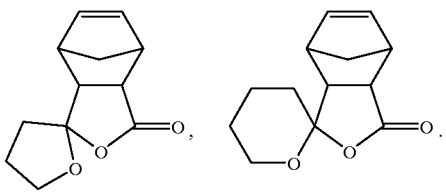

4. The ring-opened polymer as claimed in claim 1, wherein the formula (I) is

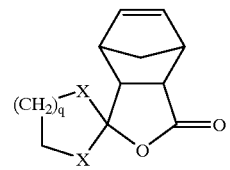

wherein m is an integer from 1 to 3.

5. The ring-opened polymer as claimed in claim 1, wherein the formula (I) is

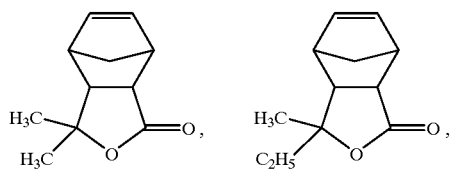

wherein q is an integer from 1 to 3, and X is selected from O, N, or S.

6. The ring-opened polymer as claimed in claim 1, wherein the polymer is prepared by reacting at least one pericyclic olefin selected from the group consisting of formulae (I) and (II) and at least one cyclic olefin through ring-opening metathesis copolymerization.

7. The ring-opened polymer as claimed in claim 1, wherein the polymer is a copolymer of at least one pericyclic olefin selected from the group consisting of formulae (I) and (II), at least one cyclic olefin, and at least one monomer other than a cyclic olefin.

8. The ring-opened polymer as claimed in claim 6, wherein the cyclic olefin is norbornene or a norbornene derivative.

9. The ring-opened polymer as claimed in claim 8, wherein the norbornene derivative is selected from the group consisting of

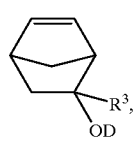
(V)

(VI)
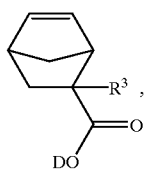

(VII)
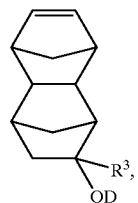

(VIII)
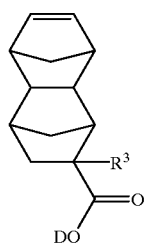

wherein

D is an acid-labile protective group, wherein the group is decomposed in the presence of an acid, so as to make the ring-opened polymer alkali-soluble, and each $R^3$ is independently selected from the group consisting of hydrogen, $C_{1-20}$ linear and branched alkyl, and $C_{3-20}$ cyclic and pericyclic alkyl.

10. The ring-opened polymer as claimed in claim 9, wherein D is selected from the group consisting of

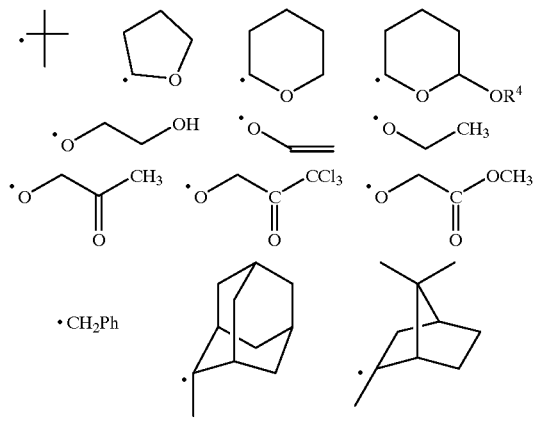

wherin $R^4$ is selected from the group consisting of hydrogen, $C_{1-20}$ linear and branched alkyl, and $C_{3-20}$ cyclic and pericyclic alkyl.

11. The ring-opened polymer as claimed in claim 1, wherein the polymer is represented by formula (III)

(III)
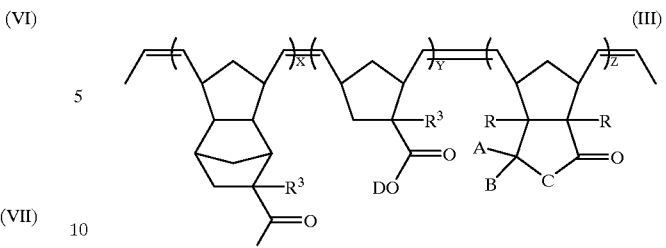

wherein

A and B are the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

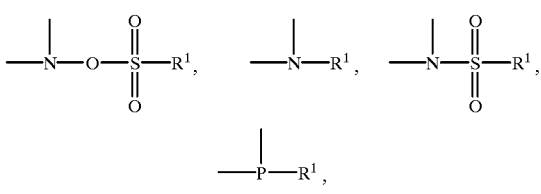

—$CH_2$—, and —$SiH_2$—, wherein each $R^1$ is independently selected from a group consisting of $C_{1-20}$ alkyl and phenyl;

each R is independently selected from a group consisting of hydrogen, halogen, and $C_{1-20}$ alkyl;

D is an acid-labile protective group, which decomposes in the presence of an acid, so as to make the ring-opened polymer alkali-soluble;

each $R^3$ is independently selected from the group consisting of hydrogen, $C_{1-20}$ linear and branched alkyl, and $C_{3-20}$ cyclic and pericyclic alkyl;

X, Y, and Z are the mole fractions of the corresponding monomers;

X+Y+Z=1; and each of X, Y, and Z is in the range of 0.1 to 0.8.

12. The ring-opened polymer as claimed in claim 1, which is represented by the following formula

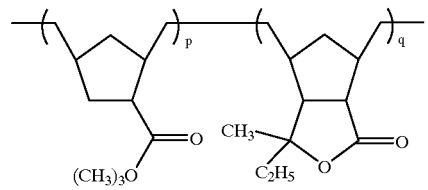

wherein p and q are the mole fractions of the corresponding monomers, and p+q=1.

13. The ring-opened polymer as claimed in claim 1, wherein the polymer is prepared by reacting at least one pericyclic olefin selected from the group consisting of formulae (I) and (II) through ring-opening metathesis polymerization in the presence of an organometallic compound or a mixture thereof as a catalyst, wherein the organometallic compound contains W, Ir, Ta, or Th.

14. The ring-opened polymer as claimed in claim 1, wherein the ploymer is soluble in an organic solvent.

15. The ring-opened polymer as claimed in claim 1, wherein the ploymer has a glass transition temperature of 70° C. to 150°C.

16. The ring-opened polymer as claimed in claim 1, wherein the ploymer has a weight average molecular weight of 1000 to 100000.

17. The ring-opened polymer as claimed in claim 1, wherein the polymer has a decomposition temperature ($T_d$) higher than 80° C.

18. The ring-opened polymer as claimed in claim 1, wherein the ring-opened polymer has an acid-labile protective group, which is decomposed in the presence of an acid, so as to make the ring-opened polymer alkali-soluble.

19. A ring-opened polymer prepared by reacting at least one pericyclic olefin selected from the group consisting of formulae (I) and (II) through ring-opening metathesis polymerization to form an unsaturated polymer; and then subjecting the unsaturated polymer to hydrogenation

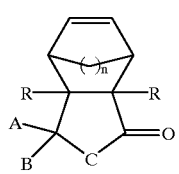
(I)

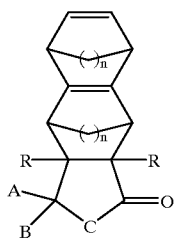
(II)

wherein

A and B are the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

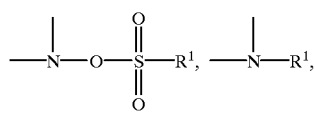

-continued

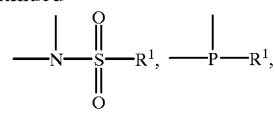

—$CH_2$—, and —$SiH_2$—, wherein each $R^1$ is independently selected from a group consisting of $C_{1-20}$ alkyl and phenyl;

each R is independently selected from a group consisting of hydrogen, halogen, and $C_{1-20}$ alkyl; and each n is an integer from 1 to 6.

20. The ring-opened polymer as claimed in claim 19, wherein n is 1 and C is oxygen.

21. The ring-opened polymer as claimed in claim 19, wherein the formula (I) is selected from the group consisting of

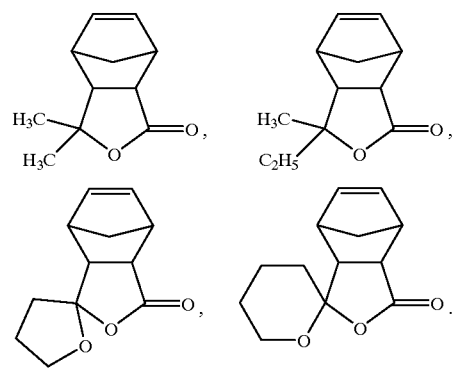

22. The ring-opened polymer as claimed in claim 19, wherein the formula (I) is

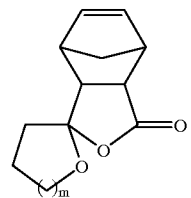

wherein m is an integer from 1 to 3.

23. The ring-opened polymer as claimed in claim 19, wherein the formula (I) is

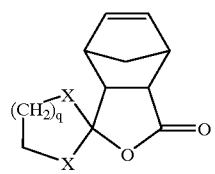

wherein q is an integer from 1 to 3, and X is selected from O, N, or S.

24. The ring-opened polymer as claimed in claim 19, which is prepared by reacting at least one pericyclic olefin selected from the group consisting of formulae (I) and (II) and at least one cyclic olefin through ring-opening metathesis polymerization to form an unsaturated polymer; and then subjecting the unsaturated polymer to hydrogenation.

25. The ring-opened polymer as claimed in claim 19, which is prepared by subjecting a copolymer of at least one pericyclic olefin selected from those represented by formulae (I) and (II), at least one cyclic olefin, and at least one monomer other than a cyclic olefin to hydrogenation.

26. The ring-opened polymer as claimed in claim 24, wherein the cyclic olefin is norbornene or a norbornene derivative.

27. The ring-opened polymer as claimed in claim 26, wherein the norbornene derivative is selected from the group consisting of

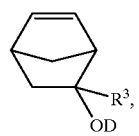

(V)

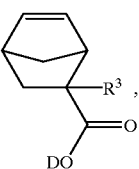

(VI)

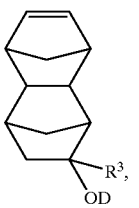

(VII)

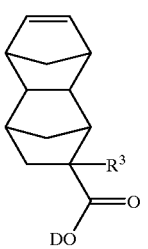

(VIII)

wherein

D is an acid-labile protective group, wherin the group is decomposed in the presence of an acid, so as to make the ring-opened polymer alkali-soluble, and each $R^3$ is independently selected from the group consisting of hydrogen, $C_{1-20}$ linear and branched alkyl, and $C_{3-20}$ cyclic and pericyclic alkyl.

28. The ring-opened polymer as claimed in claim 27, wherein D is selected from the group consisting of

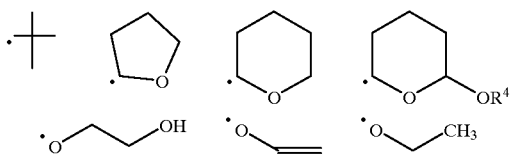

-continued

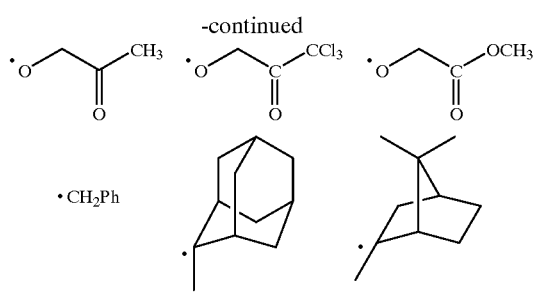

wherein $R^4$ is selected from the group consisting of hydrogen, $C_{1-20}$ linear and branched alkyl, and $C_{3-20}$ cyclic and pericyclic alkyl.

29. The ring-opened polymer as claimed in claim 19, wherein the polymer is prepared by reacting at least one pericyclic olefin selected from the group consisting of formulae (I) and (II) through ring-opening metathesis polymerization in the presence of an organometallic compound or a mixture thereof as a catalyst to form an unsaturated polymer; and then subjecting the unsaturated polymer to hydrogenation, wherein the organometallic compound contains W, Ir, Ta, or Th.

30. The ring-opened polymer as claimed in claim 19, wherein the polymer is soluble in an organic solvent.

31. The ring-opened polymer as claimed in claim 19, wherein the polymer has a glass transition temperature of 70° C. to 150° C.

32. The ring-opened polymer as claimed in claim 19, wherein the polymer has a weight average molecular weight of 1000 to 100000.

33. The ring-opened polymer as claimed in claim 19, wherein the polymer has a decomposition temperature ($T_d$) higher than 80° C.

34. The ring-opened polymer as claimed in claim 19, wherein the ring-opened polymer has an acid-labile protective group, which is decomposed in the presence of an acid, so as to make the ring-opened polymer alkali-soluble.

35. The ring-opened polymer as claimed in claim 19, wherein the polymer is represented by formula (IV)

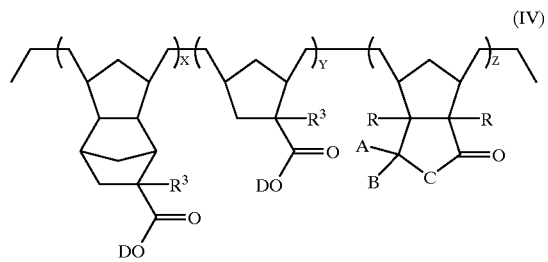

(IV)

wherein

A and B are the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

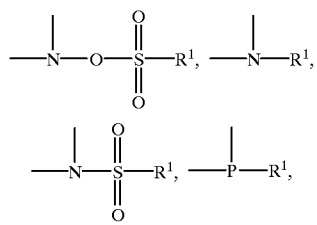

—CH$_2$—, and —SiH$_2$—, wherein each R$^1$ is independently selected from a group consisting of C$_{1-20}$ alkyl and phenyl;

each R is independently selected from a group consisting of hydrogen, halogen, and C$_{1-20}$ alkyl;

D is an acid-labile protective group, which decomposes in the presence of an acid, so as to make the ring-opened polymer alkali-soluble;

each R$^3$ is independently selected from the group consisting of hydrogen, C$_{1-20}$ linear and branched alkyl, and C$_{3-20}$ cyclic and pericyclic alkyl;

X, Y, and Z are the mole fractions of the corresponding monomers;

X+Y+Z=1; and each of X, Y, and Z is in the range of 0.1 to 0.8.

36. The ring-opened polymer as claimed in claim 19, wherein the polymer represented by the following formula

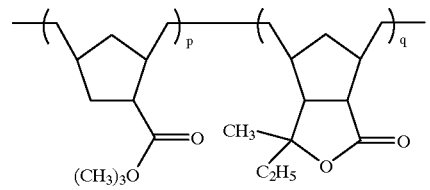

wherein p and q are the mole fractions of the corresponding monomers, and p+q=1.

37. A thin film coating composition, comprising the ring-opened polymer as claimed in claim 1.

38. A photosensitive composition comprising the ring-opened polymer as claimed in claim 1.

39. The photosensitive composition as claimed in claim 38, wherein the composition is photosensitive at a wavelength of 150 nm to 600 nm.

40. The photosensitive composition as claimed in claim 38, wherein the composition is photosensitive at a wavelength of 193 nm or 248 nm.

41. A polymer blend comprising the ring-opened polymer as claimed in claim 1 and a polymer other than the ring-opened polymer.

42. A thin film coating composition, comprising the ring-opened polymer as claimed in claim 19.

43. A photosensitive composition comprising the ring-opened polymer as claimed in claim 19.

44. A polymer blend comprising the ring-opened polymer as claimed in claim 19 and a polymer other than the ring-opened polymer.

* * * * *